(12) United States Patent
Lin et al.

(10) Patent No.: US 7,225,591 B2
(45) Date of Patent: Jun. 5, 2007

(54) FLEXIBLE TWO-PLY FLOORING SYSTEM

(75) Inventors: Hai Lin, Hangzhou (CN); Xufeng Xu, Hangzhou (CN)

(73) Assignee: Hangzhou Dazhuang Floor Co., Ltd., Youcheqiao, Linpu, Xiaoshan, Hangzhou, Zhejiang, Hangzhou (CN)

( * ) Notice: Subject to any disclaimer, the term of this patent is extended or adjusted under 35 U.S.C. 154(b) by 493 days.

(21) Appl. No.: 10/818,055

(22) Filed: Apr. 5, 2004

(65) Prior Publication Data
US 2004/0226243 A1 Nov. 18, 2004

Related U.S. Application Data

(63) Continuation-in-part of application No. 10/408,010, filed on Apr. 4, 2003, which is a continuation-in-part of application No. 09/839,078, filed on Apr. 20, 2001.

(60) Provisional application No. 60/460,461, filed on Apr. 4, 2003.

(30) Foreign Application Priority Data

Oct. 8, 2000 (CN) .............................. 00 2 54152

(51) Int. Cl.
*E04F 15/22* (2006.01)
(52) U.S. Cl. .................. 52/403.1; 52/391; 52/581; 52/589.1; 52/591.1; 52/592.1; 52/480
(58) Field of Classification Search .............. 52/403.1, 52/480, 390–392, 309.3, 591.1, 592.1, 592.3, 52/581, 589.1
See application file for complete search history.

(56) References Cited

U.S. PATENT DOCUMENTS

| | | | | |
|---|---|---|---|---|
| 1,387,011 | A | * | 8/1921 | Ratcliff ........................ 428/490 |
| 1,465,383 | A | | 8/1923 | Walsh et al. |
| 1,778,069 | A | | 10/1930 | Fetz |
| 2,862,255 | A | | 12/1958 | Nelson |
| 3,509,234 | A | | 4/1970 | Burlant et al. |
| 3,616,128 | A | * | 10/1971 | Pacourek ..................... 428/106 |
| 3,769,143 | A | * | 10/1973 | Kulesza ....................... 428/151 |
| 3,970,497 | A | * | 7/1976 | Glover et al. ............... 156/182 |
| 4,332,384 | A | | 6/1982 | Hasegawa |
| 4,471,012 | A | * | 9/1984 | Maxwell ..................... 428/106 |
| 4,569,873 | A | * | 2/1986 | Robbins ...................... 428/106 |
| 4,600,336 | A | | 7/1986 | Waller |

(Continued)

FOREIGN PATENT DOCUMENTS

CN 00254152.1 10/2000

(Continued)

*Primary Examiner*—Jeanette Chapman
*Assistant Examiner*—Yvonne M. Horton
(74) *Attorney, Agent, or Firm*—Albert Wai-Kit Chan

(57) ABSTRACT

A two-ply flooring plank is disclosed having two layers or "plies" with a bottom layer having a grain that runs generally transverse to a top layer or "cross-ply" to provide dimensional stability to the plank. The bottom layer includes a number of strips secured to the bottom of the top layer. The bottom layer strips are also placed with gaps between the individual strips of the second layer to allow flexibility of the flooring plank, which allows the flooring to more easily conform to irregularities in a subfloor upon which the flooring plank is mounted.

15 Claims, 9 Drawing Sheets

U.S. PATENT DOCUMENTS

Figure 1:
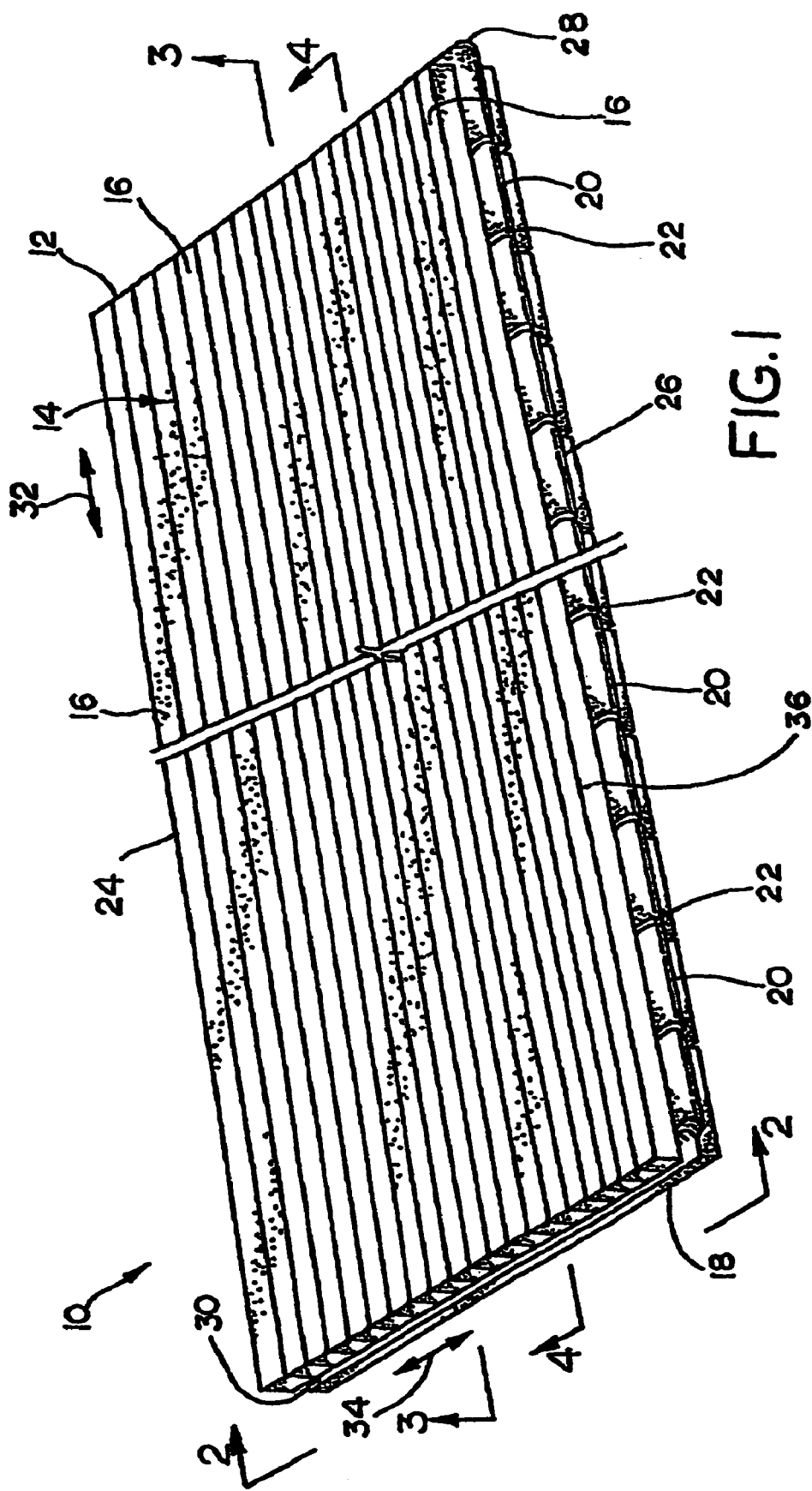

| | | | |
|---|---|---|---|
| 4,743,484 A * | 5/1988 | Robbins | 428/106 |
| 4,796,402 A | 1/1989 | Pajala | |
| 4,810,551 A | 3/1989 | Chu | |
| 4,840,825 A | 6/1989 | Aristodimou | |
| 4,844,763 A * | 7/1989 | Robbins | 156/269 |
| 5,103,614 A * | 4/1992 | Kawaguchi et al. | 52/392 |
| 5,283,102 A | 2/1994 | Sweet et al. | |
| 5,543,197 A | 8/1996 | Plaehn | |
| 5,671,575 A | 9/1997 | Wu | |
| 5,786,063 A | 7/1998 | Shibusawa et al. | |
| 5,822,944 A | 10/1998 | Penland, Sr. | |
| 5,830,549 A | 11/1998 | Sweet et al. | |
| 5,894,700 A | 4/1999 | Sweet | |
| 5,900,099 A | 5/1999 | Sweet et al. | |
| 5,976,644 A | 11/1999 | Sanaee et al. | |
| 6,021,615 A | 2/2000 | Brown | |
| 6,055,785 A | 5/2000 | Counihan | |
| 6,065,264 A | 5/2000 | Imler et al. | |
| 6,115,981 A | 9/2000 | Counihan | |
| 6,156,402 A | 12/2000 | Smith | |
| 6,158,185 A | 12/2000 | Counihan | |
| 6,182,413 B1 | 2/2001 | Magnusson | |
| 6,291,078 B1 | 9/2001 | Chen et al. | |
| 7,152,379 B2 * | 12/2006 | Lin et al. | 52/403.1 |
| 2002/0152701 A1 | 10/2002 | Zhang et al. | |
| 2004/0074190 A1 | 4/2004 | Lin et al. | |

FOREIGN PATENT DOCUMENTS

| | | | |
|---|---|---|---|
| EP | 0194238 | * | 9/1986 |
| GB | 331189 | | 6/1930 |
| WO | WO 03057480 | * | 7/2003 |

* cited by examiner

FLEXIBLE TWO-PLY FLOORING SYSTEM

This application is a continuation-in-part of U.S. Ser. No. 10/408,010 filed Apr. 4, 2003,which is a continuation-in-part of U.S. Ser. No. 09/839,078, filed Apr. 20, 2001, and which claims benefit of Chinese Patent No. 002 54152.1, filed Oct. 8, 2000. This application also claims benefit of U.S. Ser. No. 60/460,461, filed Apr. 4, 2003. The preceding applications to which the present application claims benefit or priority are herein incorporated by reference in their entirety.

Throughout this application, various publications are referenced. Disclosures of these publications in their entireties are hereby incorporated by reference into this application in order to more fully describe the state of the art to which this invention pertains.

BACKGROUND OF THE INVENTION

The present invention relates to a flooring product having a two-ply construction that is mounted to a base subfloor and, more particularly, to a bamboo or wood flooring plank with a bottom ply having a grain direction transverse to a grain direction of the top ply.

Various wood and bamboo flooring products are known in the art. Typically, wood flooring products, for example, are constructed of strips or planks that are either glued or nailed to a subfloor. The planks are typically constructed with a tongue on one side and a groove on an opposite side. When the flooring product is installed the tongue of one plank is mated with a groove on an adjacent plank to lock the planks together side-by-side to form an assembled floor.

Problems that may arise in such flooring products include warping, twisting and buckling of the flooring planks. For example, when the subfloor has irregularities and unevenness, the planks, having little flexibility, do not entirely conform to the irregularities and uneven portions of the subfloor, thus contributing to the above enumerated problems. Furthermore, flooring planks having longer lengths are more prone to warping, cupping and twisting not only after installation on the subfloor, but also prior to installation, thereby rendering the plank unusable. Thus, if the flooring plank has little or no flexibility, planks may be unusable for installation.

Previous attempts to create a flexible flooring plank have included a three-piece laminated wood floor having top, intermediate and bottom layers. The top and bottom layers have the same grain orientation while the intermediate layer located between the top and bottom layers has a grain orientation perpendicular to the grain orientation of the surrounding layers. The bottom layer includes a multiplicity of closely spaced-apart, cross-cut scores that extend across the width of the flooring plank and allow a degree of flexibility of the flooring plank. However, the cross-cut scores of this prior art flooring plank do not extend completely through the entire depth of the bottom layer to maintain a degree of rigidity of the overall flooring plank. Furthermore, since the top and bottom layers have the same grain orientation the additional third intermediate layer needs to have a perpendicular grain in order to provide stability in the transverse direction. Accordingly, the prior art utilizes a higher amount of material to construct the flooring plank while still possessing a significant degree of inflexibility of the bottom layer contacting the subfloor because the cut scores do not extend entirely through the bottom layer.

Other disadvantages of existing flooring include but are not limited to waste of materials, difficulty in materials selection, low yield, complicated processing technology, high consumption of adhesive, adjustable and/or detachable form of floor block and easy deformation.

Wu, U.S. Pat. No. 5,671,575, issued Sep. 30, 1997, entitled "Flooring Assembly", discloses a flooring assembly comprising a required number of bottom foundation elements and top flooring elements having the same grain orientation. The top side of each foundation elements and the bottom side of each flooring elements contain corresponding grooves and face projections for joining the flooring elements and the foundation elements. The corresponding grooves and face projections on each flooring elements and foundation elements have a vertical surface at one side and inclined surface at the other side. A drawback of such arrangement is that the foundation elements extend completely throughout the entire flooring surface, thus requiring a higher amount of material to construct the flooring assembly. Another drawback of such arrangement is that the corresponding grooves and face projections, which contain vertical surface at one side and inclined surface at the other side, located on the bottom side of each flooring elements or on the top side of each foundation elements are rigidly joined or fixed, thus causing the flooring assembly to be rather inflexible, which tend to create problems including but not limited to warping, twisting, twisting, cupping and bucking of the flooring elements and/or foundation elements when, for example, the flooring surface contain irregularities or uneven portions.

Penland, U.S. Pat. No. 5,822,944, issued Oct. 20, 1998, entitled "Double Locking Flooring System for a Construction Site", discloses a method and apparatus for constructing a two-layer flooring system for use at a construction or oil well drilling site by interlocking "mat units" having locking tabs and corresponding end locking slots. Penland only discloses a flooring system that should be "strong and sturdy enough to support heavy equipment, yet easily installed and removed," but Penland does not teach how to use or construct a flooring system which conforms to or compensates for the irregularities or uneven portions on the flooring surface to create a floor with a relatively leveled or flat surface, nor does Penland teach how to minimize or prevent deformations including but not limited to shrinkage, expansion, warping, twisting and buckling, which frequently occur in commercial or home-use wood or bamboo flooring products as a result of changing weather conditions or frequent use.

Accordingly, there is a need for a flooring product having increased flexibility that also utilizes less material as well as possessing dimensional stability in both the longitudinal and traverse directions of the flooring plank. It is an objection of this invention to overcome the above-mentioned disadvantages by providing improved two-layer staggered combined flooring and a two-ply flooring having a cross-grain bottom ply.

SUMMARY OF THE INVENTION

A flexible flooring plank constructed according to the teachings of the present application meets the above need by providing a wood or bamboo flooring plank that utilizes less wood or bamboo material while providing increased flexibility and dimensional stability.

According to an embodiment, a flooring plank includes a first layer including a first plurality of strips that are secured together. Each of the first plurality of strips has a grain extending generally in a longitudinal direction of the plank. The flooring plank also includes a second layer secured to one face of the first layer. The second layer includes a second plurality of spaced strips each having a grain extending generally transversely to the longitudinal direction of the plank.

According to another embodiment, a flooring plank includes a first layer comprising a first plurality of bamboo strips secured together in side-by-side relation, wherein each strip has a grain extending generally parallel to a longitudinal dimension of the plank. A second layer is secured to one face of the first layer, wherein the second layer includes a second plurality of strips each having a grain extending generally transverse to the longitudinal dimension of the plank.

The above described arrangements include a transverse or "cross" grain on the second layer that affords dimensional stability to the flooring plank. Additionally, the use of plurality of second strips affixed to the first layer with gaps in between each of the placed plurality of second strips affords full flexibility without the constraints of the prior art wherein the layer that provides flexibility does not contain full scores or gaps completely through the entire layer.

The foregoing objects and advantages of the invention are illustrative of those that can be achieved by the present invention and are not intended to be exhaustive or limiting of the possible advantages which can be realized. Thus, these and other objects will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

DETAILED DESCRIPTION OF THE FIGURES

The drawings which illustrate specific embodiments of the invention should not be construed as restricting the spirit or scope of the invention in any way:

FIG. 1. illustrates a tri-metric view of a flooring plank constructed according to the teachings of the present invention.

Figure 2:
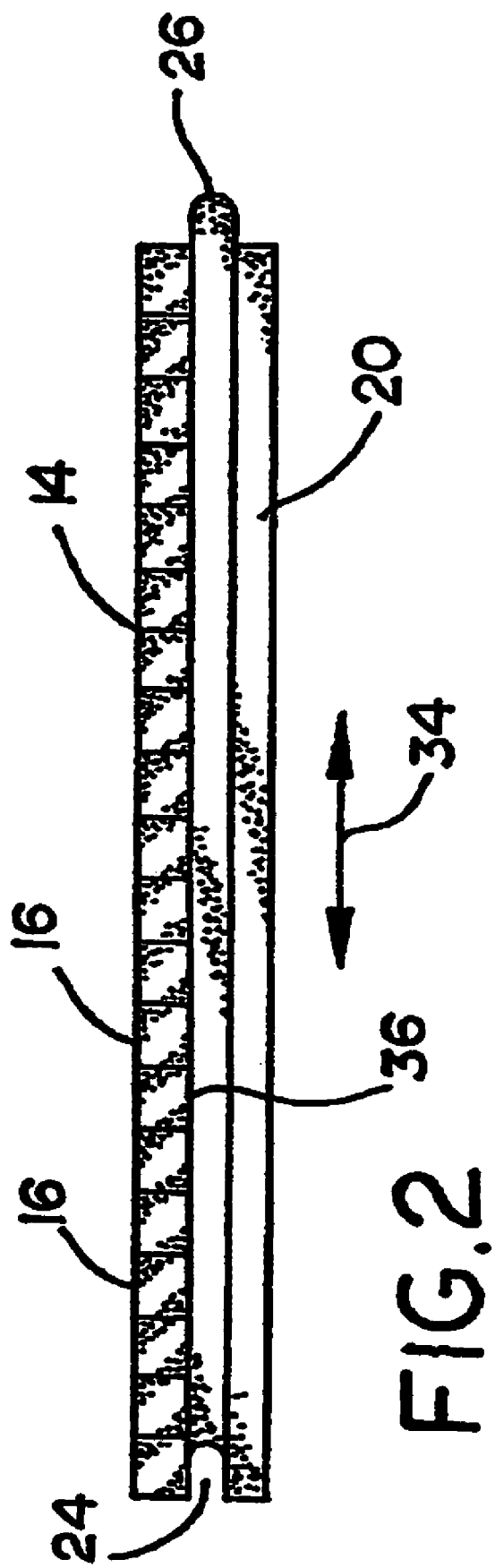

FIG. 2. illustrates an end (or cross-sectional) view of the flooring plank constructed according to the teachings of the present invention.

Figure 3:
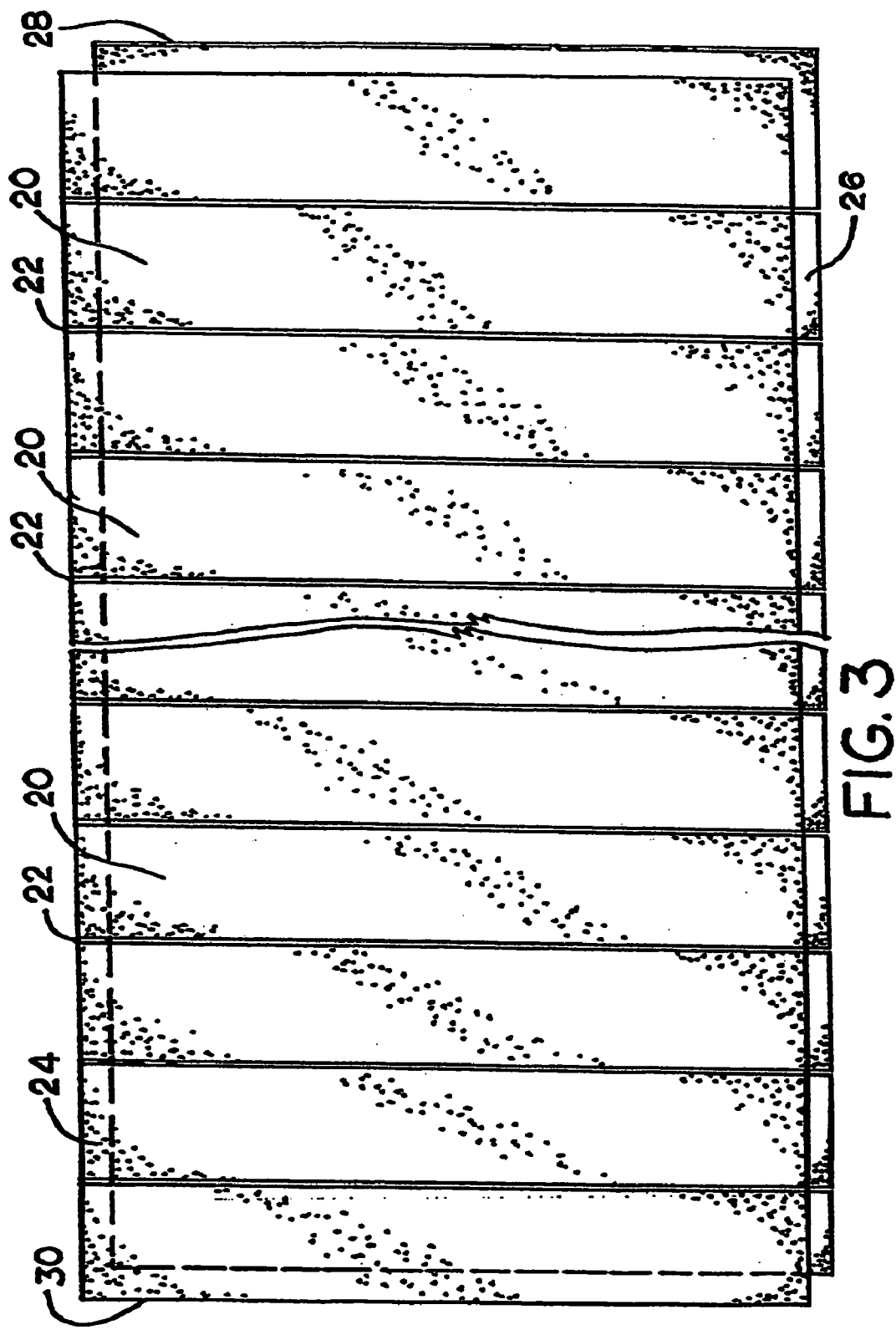

FIG. 3. illustrates a bottom view of the flooring plank constructed according to the teachings of the present invention.

Figure 4:
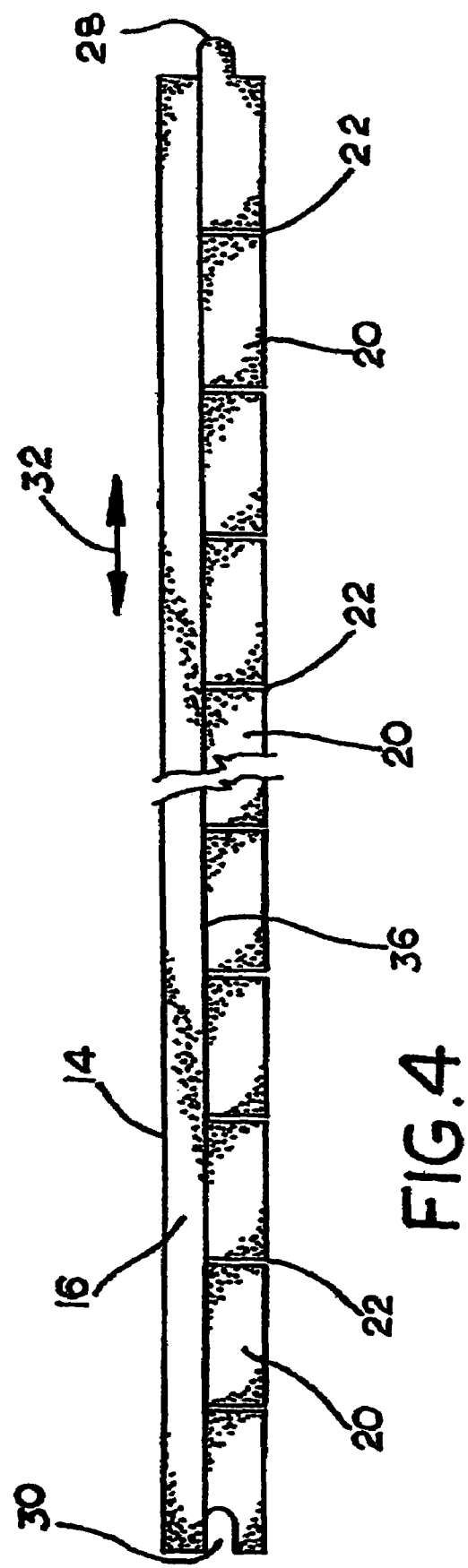

FIG. 4. illustrates a side view of the flooring plank constructed according to the teachings of the present invention.

Figure 5:
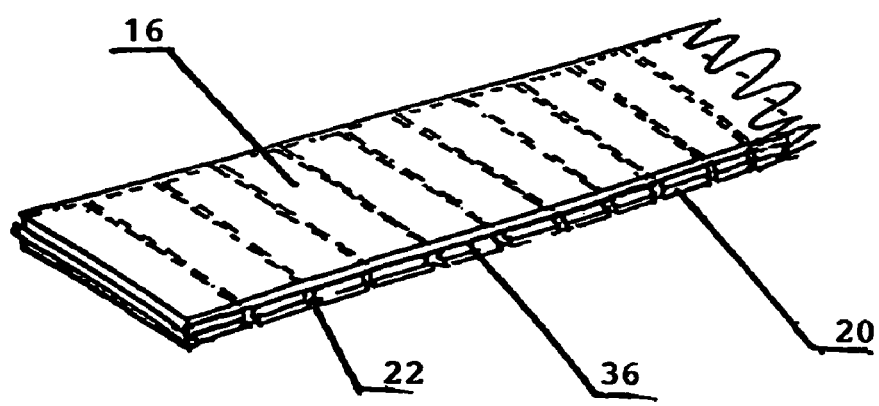

FIG. 5. illustrates a schematic view of the flooring plank constructed according to the teachings of the present invention.

Figure 6:
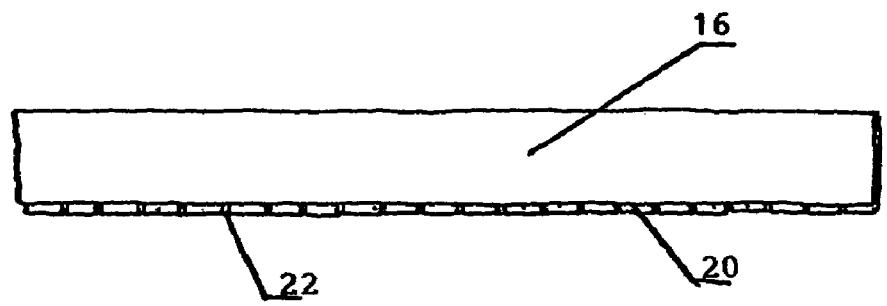

FIG. 6. illustrates a front view of the flooring plank constructed according to the teachings of the present invention.

Figure 7:
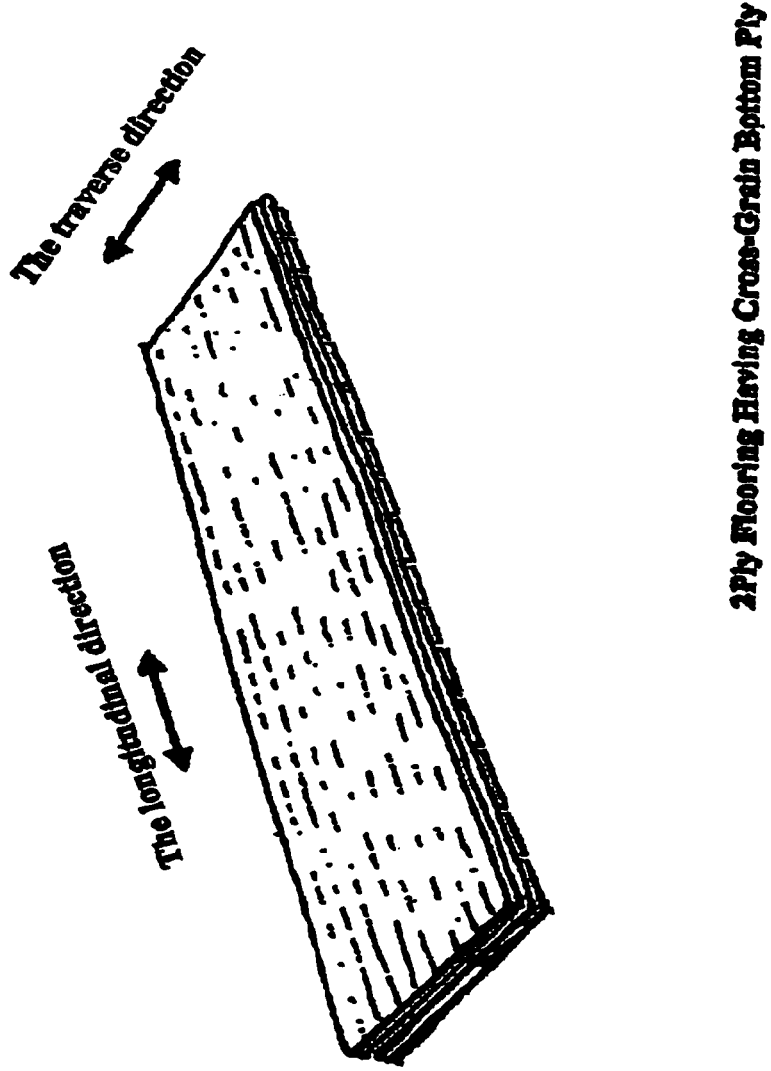

FIG. 7. illustrates a side elevation view of the flooring plank constructed according to the teachings of the present invention.

Figure 8:
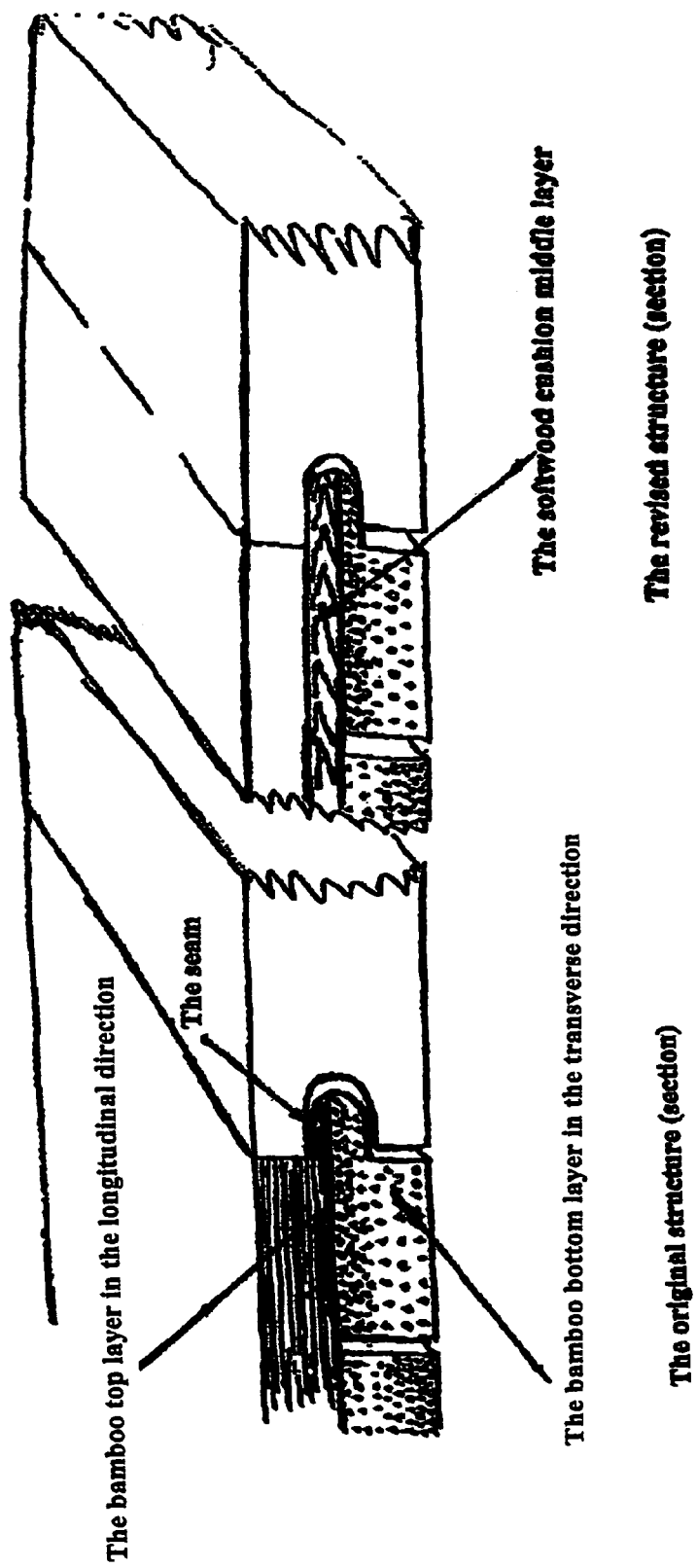

FIG. 8. illustrates a side view of the flooring plank constructed according to the teachings of the present invention having softwood cushion middle layer as discussed in Example 2.

Figure 9:
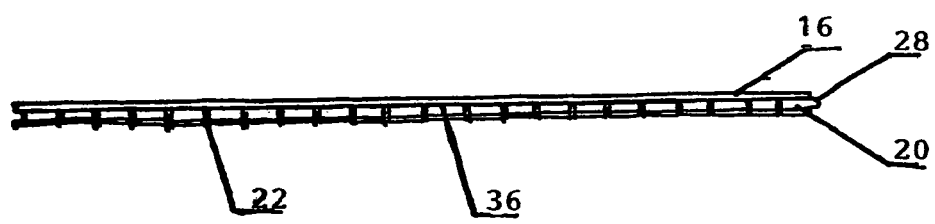

FIG. 9. illustrates an overall view of the flooring plank constructed according to the teachings of the present invention having a surface board 16, bottom board 20, adhesive layer 36, slot mortis 28 and spacing 22 between the strips on the bottom layer.

DETAILED DESCRIPTION OF THE INVENTION

This invention provides a self-adjusting flooring plank, comprising: a first top layer including a first plurality of strips that are secured together, each of the first plurality of strips having a grain extending generally in a longitudinal direction of the plank; a second bottom layer secured to one face of the first layer, the second layer including a second plurality of strips each having a grain extending generally transversely to the longitudinal direction of the plank, wherein said second plurality of strips are spaced from one another by gaps of appropriate width. The appropriate width therefore can increase the flexibility of the final planks. The first or second layer of the plank having at least one tongue at one side configured to mate with at least one groove of another or adjacent plank; the first or second layer of the plank having at least one groove at the other side configured to receive at least one tongue of another or adjacent plank; and a cushion middle layer. In an embodiment, the second plurality of strips is spaced equally at less than one millimeter. In another embodiment, second plurality of strips is space unequally.

Referring to the drawings, which should not be considered as limitations to the claimed invention but merely as examples, a flooring plank constructed in accordance with the teachings of the disclosed invention is illustrated in FIG. 1 and shown generally at reference number 10. The flooring plank 10 has two layers or "plies" including a first or top layer 12 and a second or bottom layer 18. The top layer 12 is comprised of a plurality of strips 16 that are adhered together by glue or any other suitable adhesive in side-by-side relation. Preferably, as seen in FIG. 2, these strips 16 have a generally square or rectangular cross section and are comprised of a hard grass such as bamboo, but may alternatively be comprised of wood or other suitable natural or artificial materials including but not limited to, particleboard, fiberboard, hardboard or wood polymer composite materials. These strips 16 are cut and arranged such that each of the plurality of the strips has a grain extending along (i.e., substantially parallel to) a longitudinal direction of the plank 10 as indicated by arrow 32. In a preferred embodiment, all of the strips 16 are uniform size and shape and each is approximately 0.5 millimeters square.

One or more coats of a non-toxic, clear acrylic urethane are applied to a top face 14 or surface of the first layer. The urethane provides a finish that resists wear caused by traffic on such surface after installation of the plank 10 on the subfloor. The top face 14 preferably has at least four coats of acrylic urethane applied with ultraviolet curing. Alternatively, other embodiments may include application of some further finish materials such as aluminum oxide, for example, on top of the clear acrylic urethane for achieving increased wear resistance and also different finish textures. Other finishes could be used instead, as desired, to achieve various finish appearances such as matte, semi-gloss or gloss, for example. Additionally, color finish of the strips 16 may be unfinished, stained, carbonized, or some other color finishing, as desired.

A plurality of second strips 20 comprising a second or bottom layer 18 is secured to an undersurface 36 of the first layer 12. As illustrated in FIGS. 1 and 3, these second layer strips 20 are spaced from one another by gaps 22 having substantially equal gap widths. Preferably, each gap width is approximately equal to one millimeter to afford flexibility of the flooring plank 10 along longitudinal direction 32. However, this predetermined gap width may be less than or greater than the one millimeter distance, depending on the desired flexibility of the flooring plank 10. In addition, the gap widths may be unequal over the length of each plank 10, if desired.

A feature of the plurality of second strips 20 is that the grain of each of the second strips 20 is oriented generally in a direction transverse or "cross-ply" to the grain direction of the plurality of first strip 16. This direction is shown as arrow 34 in FIGS. 1 and 2. Additionally, the second strips 20 are preferably comprised of bamboo or wood and may be "rough" cut since they are not visible after installation of the plank 10 on the subfloor. Accordingly, the strips 20 do not require costly finishing and may even be comprised of scrap pieces of bamboo or wood that are simply cut to the required dimensions. Alternatively, the strips 20 may be made of other suitable natural or artificial materials including but not limited to particleboard, fiberboard, hardboard or wood polymer composite materials, as desired.

A property of conventional constructed flooring planks is that contraction and expansion in the longitudinal direction is greater than in the transverse direction. The above-disclosed cross-ply construction, however, tends to minimize and balance the disparate rates of contraction, which affords added stability to the plank 10.

The flooring plank 10 is provided with a tongue and groove construction wherein a tongue 26 is machined substantially in the second layer 18 on one longitudinal side of the flooring plank 10 as illustrated in both FIGS. 1 and 2. A groove 24 is machined substantially in the second layer 18 on the opposing longitudinal side of the flooring plank 10. The groove 24 is of a size and shape to receive a tongue of another flooring plank 10 having the profile of the tongue 26. Additionally, the flooring plank 10 features tongue and groove construction on the ends of each plank 10 in order to assure interlocking of flooring planks 10 abutting one another at the ends. To that end, a tongue 28 is machined substantially in the second layer 18 on one end of the flooring plank 10 as shown in FIGS. 1, 3 and 4. In the opposing end of the flooring plank a groove 30 is machined in the second layer 18 and is sized and shaped to mate with a corresponding tongue 28 on another flooring plank 10. Alternatively, the grooves and/or tongues may be formed in both the first and second layers or solely in the first layer.

In yet another embodiment according to the teachings of the present application the six sides comprised of the top side 14 of the top layer 12, the bottom side 38 shown in FIG. 2 of the bottom layer 18, the two ends of the plank 10 and the two sides of the plank 10 are coated with at least one coat of acrylic urethane in order to provide protection for the entire plank. The top side 14 of the plank may further include additional layers of acrylic urethane and/or aluminum oxide dependent on the particular wear resistance and finish desired, as discussed previously.

This invention provides a flooring, particularly a two-layer staggered combined flooring. The existing flooring in the prior art uses a solid block of timber and bamboo combined from single-layer, three-layer or even multi-layer. Its disadvantages include waste of materials, difficulty in materials selection, low yield, complicated processing technology, high consumption of adhesive, adjustable form of the floor block and easy deformation. This invention aims at overcoming the above-mentioned disadvantages by providing an improved two-layer staggered combined flooring.

This invention provides a flooring plank comprising: a first layer including a first plurality of strips that are secured together, each of the first plurality of strips having a grain extending generally in a longitudinal direction of the plank; a second layer secured to one face of the first layer, the second layer including a second plurality of spaced strips each having a grain extending generally transversely to the longitudinal direction of the plank; at least one tongue configured to mate with at least one groove of another flooring plank; at least one groove configured to receive at least one tongue of another flooring plank; and a cushion middle layer. In an embodiment, the cushion middle layer comprises softwood.

In an embodiment of the flooring plank each of the strips is composed of at least one of bamboo and wood. In another embodiment, another face of the first layer is coated with at least one coat of acrylic urethane.

In a separate embodiment, the plank includes at least one coat of acrylic urethane disposed on multiple surfaces thereof.

In a further embodiment, one application of aluminum oxide disposed thereon.

This invention provides a flooring plank wherein the surface board is fabricated from sheets, which are processed from wood, bamboo or other suitable natural or artificial materials including but not limited to particleboard, fiberboard, hardboard or wood polymer composite materials along their fiber direction, or it is possible to fabricate the surface board from the single-layer board combined from the small sheets. In an embodiment, the bottom board is fabricated from small sheet-strips with the above-described method. In another embodiment, the top layer sheet-strips and the bottom layer sheet-strips are staggered at an angle of 45°-90° along the fiber direction and adhered into combined floor covering through an adhesive layer. In a further embodiment, the 6 edges of the flooring plank are planed. During adhesion the sheet-strips are parallel to each other with a gap between them. Because the dry shrinkage of the wood and bamboo in longitudinal direction is normally 0%-4% and in transverse direction is normally 15%-9%, this structure effectively restricts the expansion and shrinkage due to change of the weather and effectively reduces its deformation in the width direction. Depending on the various change of the weather in the area of use, increasing the space between the two strips can improve dimensions stability and flatness of the floor covering, and can overcome its deformation that is the disadvantage of the current floor covering. When making the tongue and the groove at the periphery of the board, the longitudinal fiber of the bottom layer can effectively increase strength of the tongue and the groove. This can greatly reduce damage during installation. This method can also be used for manufacture of floor covering with flat edges, i.e. without tongue and groove. The board used in this case can be fabricated by combination from solid wood or wood and bamboo or other suitable natural or artificial materials including but not limited to particleboard, fiberboard, hardboard or wood polymer composite materials.

This invention provides the following advantages: simple manufacturing process and technology, and high utilization rate of raw materials. The traditional solid wood flooring and bamboo flooring industry experience shortage and instability in raw material supply. The multi-layer combined floor covering has the disadvantages of waste of materials and complicated manufacturing process or technology. Two-layer combined flooring of the present invention can remarkably increase utilization rate of raw materials and simplify the manufacturing process and technology.

By decreasing the shrinkage of the flooring plank in its width direction, restriction of change in the width direction and reduction of occurrence of curving deformation of the floor covering or flooring plank due to change in weather conditions can be effected. Solid wood floor covering or full-bamboo floor coverings in the prior art are easily bent due to humidity and the temperature difference at top and bottom layer of the floor covering. The two-layer staggered combined floor covering can overcome this disadvantage.

Increasing the strength of the tongue and groove can minimize or reduce damage during usage or installation. The slot mortise at the edge of the traditional floor covering in the prior art frequently crack during transportation and installation process. This has a negative impact on the firmness and structural integrity of the installed floor covering. When the two-layer staggered combined floor covering constructed according to this invention is processed for the tongue and groove, the longitudinal fiber of the slot mortise will not be damaged by impact under normal conditions of transportation and/or installation. Therefore, the firmness and installation strength of the two-layer staggered combined floor covering constructed according to this invention overcomes the disadvantages of tongue and groove of the floor covering as disclosed in the prior art.

The Examples below illustrate the invention.

EXAMPLE 1

The combined floor covering if this invention comprises a surface board and a bottom board joined together by an adhesive layer or suitable adhesive. The surface board and bottom board form an angle of 45° to 90° staggered with respect to each layer or surface according to the respective fiber direction of each layer. The said bottom board is comprised of plurality of strips being spaced apart, preferable at least one millimeter. The strips are parallel to each other and have a joint between them. The said combined floor covering has tongue and groove at its periphery for mortise joint. In an embodiment, the bottom board may also be parallel to each other without a joint between them. In another embodiment, the combined flooring can also be without the tongue and groove at its periphery for mortise joint, i.e. with flat joint.

EXAMPLE 2

This invention provides for an improved two-ply flooring having a cross-grain bottom ply. The original design emphasizes the control of cupping deformation in the transverse direction. In the improved two-ply flooring, an one-ply cross grain softwood with 0.3-0.4 densities is added between the top layer and the bottom layer. The improved two-ply flooring having a cross-grain bottom ply alleviates both shrinkage and expansion of the bottom layer caused by the change of moisture content. Consequently, the improve two-ply flooring reduces bending in the length direction greatly.

As will be apparent to those skilled in the art in light of the foregoing disclosures, many alterations and modifications are possible in the practice of this invention without departing from the spirit or scope thereof. Accordingly, the scope of the invention is to be construed in accordance with the substance defined by the following claims.

What is claimed is:

1. A flexible flooring plank, comprising:
    a first top layer including a first plurality of strips that are secured together, each of the first plurality of strips having a grain extending generally in a longitudinal direction of the plank;
    a second bottom layer secured to one face of the first layer, the second layer including a second plurality of strips each having a grain extending generally transversely to the longitudinal direction of the plank, wherein the second plurality of strips are spaced from one another by gaps having appropriate gap width;
    the first or second layer of the plank having at least one tongue at one side configured to mate with at least one groove of another or adjacent plank;
    the first or second layer of the plank having at least one groove at the other side configured to receive at least one tongue of another or adjacent plank; and
    a cushion middle layer.

2. The flooring plank according to claim 1, wherein each of the strips is composed of at least one of bamboo, wood, particleboard, fiberboard, hardboard and wood polymer composite materials.

3. The flooring plank according to claim 1, wherein another face of the first layer is coated with at least one coat of acrylic urethane.

4. The flooring plank according to claim 1, further including at least one tongue configured to mate with at least one groove of another flooring plank.

5. The flooring plank according to claim 1, further including at least one groove configured to receive at least one tongue of another flooring plank.

6. The flooring plank according to claim 1, further including at least one coat of acrylic urethane disposed on multiple surfaces thereof.

7. The flooring plank according to claim 1, having at least one application of aluminum oxide disposed thereon.

8. The flooring plank according to claim 1, wherein the second plurality of strips are spaced from one another by gaps having at least one millimeter gap width.

9. The flooring plank according to claim 1, wherein the second plurality of strips are spaced from one another by gaps having less than one millimeter gap width.

10. The flooring plank according to claim 1, wherein the second plurality of strips are spaced from one another by gaps having unequal gap width.

11. The flooring plank according to claim 1 wherein, the first layer comprises prefabricated sheets of wood, bamboo or other suitable materials including but not limited to particleboard, fiberboard, hardboard or wood polymer composite materials.

12. The flooring plank according to claims 1, wherein the first plurality of strips and the second plurality of strips are staggered at an angle between 45° to 90° with respect to their grain direction.

13. The flooring plank according to claims 11, wherein the first layer and the second plurality of strips are staggered at an angle between 45° to 90° with respect to their grain direction.

14. The flooring plank according to claim 8, wherein the second plurality of strips are spaced from one another by gaps having unequal gap width.

15. The flooring plank according to claim 9, wherein the second plurality of strips are spaced from one another by gaps having unequal gap width.

* * * * *